United States Patent
Su

(10) Patent No.: US 10,120,676 B2
(45) Date of Patent: Nov. 6, 2018

(54) METHOD OF UPDATING BASEBOARD MANAGEMENT CONTROLLER FIRMWARE FOR FAN SPEED CONTROL

(71) Applicant: MITAC COMPUTING TECHNOLOGY CORPORATION, Taoyuan (TW)

(72) Inventor: Chien-Huai Su, Hsinchu (TW)

(73) Assignee: Mitac Computing Technology Corporation, Taoyuan (TW)

( * ) Notice: Subject to any disclaimer, the term of this patent is extended or adjusted under 35 U.S.C. 154(b) by 0 days.

(21) Appl. No.: 15/857,345

(22) Filed: Dec. 28, 2017

(65) Prior Publication Data
US 2018/0210724 A1 Jul. 26, 2018

(30) Foreign Application Priority Data
Jan. 20, 2017 (TW) .............................. 106102030 A

(51) Int. Cl.
G06F 9/44 (2018.01)
G06F 1/26 (2006.01)
G06F 9/445 (2018.01)
G06F 8/65 (2018.01)
H02P 7/00 (2016.01)

(52) U.S. Cl.
CPC . *G06F 8/65* (2013.01); *H02P 7/00* (2013.01)

(58) Field of Classification Search
CPC ... G06F 1/206; G06F 1/20; G06F 1/26; G06F 1/3203; G06F 8/65; G06F 8/654; G06F 8/665; G06F 9/4416; H02P 7/00
See application file for complete search history.

(56) References Cited

U.S. PATENT DOCUMENTS

| | | | | |
|---|---|---|---|---|
| 6,657,325 B2 * | 12/2003 | Dixon | ....................... | G06F 1/20 307/149 |
| 7,870,379 B2 * | 1/2011 | Krieger | ..................... | G06F 1/26 713/100 |
| 2012/0272226 A1 * | 10/2012 | Yang | ........................ | G06F 8/65 717/168 |
| 2017/0329598 A1 * | 11/2017 | Hobson | .................. | G06F 1/206 |

OTHER PUBLICATIONS

Kim et al., Global fan speed control considering non-ideal temperature measurements in enterprise servers, 6 pages (Year: 2014).*

* cited by examiner

*Primary Examiner* — Thuy Dao
(74) *Attorney, Agent, or Firm* — Michael Best & Friedrich LLP

(57) ABSTRACT

When a baseboard management controller (BMC) is used to control a fan speed of a fan unit of a server by executing a firmware with fan parameter data stored in one temporary storage region, the fan parameter data is updated by receiving fan parameter update data and storing the fan parameter update data in another temporary storage region, and updating the fan parameter data using the fan parameter update data after determining that the received fan parameter update data is valid.

12 Claims, 2 Drawing Sheets

Fan parameter data

METHOD OF UPDATING BASEBOARD MANAGEMENT CONTROLLER FIRMWARE FOR FAN SPEED CONTROL

CROSS-REFERENCE TO RELATED APPLICATION

This application claims priority of Taiwanese Patent Application No. 106102030, filed on Jan. 20, 2017.

FIELD

The disclosure relates to a baseboard management controller firmware updating method, and more particularly to a method of updating baseboard management controller firmware for fan speed control.

BACKGROUND

A baseboard management controller (BMC) is a specialized service processor that monitors the physical state of a server using sensors mounted in the server. Among all types of physical state monitoring, the monitoring of heat dissipation is very important to the operation of a server. Generally, a BMC controls the rotary speed(s) of one or more fans that are installed in a server according to a fan speed control algorithm which is included in a BMC firmware in the form of a software program.

Server products of the same series may include several stock keeping units (SKUs) with different hardware configurations, which may require different fan speed control algorithms. For a single BMC firmware to be applicable to different SKUs, multiple fan speed control algorithms corresponding to the different SKUs must be packaged in multiple programs and included in the single BMC firmware, which would thus occupy considerable storage space in a storage device, such as a flash memory device. The BMC firmware generally includes core software codes and fan setting parameters, and either the core software codes or the fan setting parameters may be updated frequently during product development. To edit or adjust the BMC firmware, for instance, with respect to fan setting parameters of the fan speed control algorithm, the BMC firmware must be updated through a burning process and reboot operation, which are quite inconvenient.

Particularly, during development of the server products, the BMC firmware update may be required frequently for optimizing the fan setting parameters of the fan speed control algorithm which are associated with heat dissipation. For trial of a new set of fan setting parameters, update of the BMC firmware would be required to generate a corresponding new version of the BMC firmware by going through the burning process and the reboot operation, consuming significant amount of manpower and time.

SUMMARY

Therefore, an object of the disclosure is to provide a method of updating baseboard management controller firmware for fan speed control that can alleviate at least one of the drawbacks of the prior art.

According to the disclosure, the method of updating baseboard management controller firmware is implemented by a baseboard management control system that includes a storage device, a temporary storage device, and a baseboard management controller. The storage device is for storing therein a firmware associated with operation of a fan unit. The firmware contains fan parameter data that is associated with control of a rotary speed of the fan unit. The temporary storage device is used to store the firmware received from the storage device, and has a first temporary storage region, and a second temporary storage region for storing therein the fan parameter data. The baseboard management controller is coupled to the fan unit, the storage device and the temporary storage device. The baseboard management controller controls the rotary speed of the fan unit by executing the firmware stored in the temporary storage device. The method includes: starting to receive, by the baseboard management controller in response to receipt of an instruction indicating a firmware update operation, fan parameter update data associated with control of the rotary speed of the fan unit, and storing the fan parameter update data thus received in the first temporary storage region of the temporary storage device; determining, by the baseboard management controller after completion of receipt and storage of the fan parameter update data in the first temporary storage region of the temporary storage device, whether or not the fan parameter update data stored in the first temporary storage region of the temporary storage device is valid; and updating, by the baseboard management controller after determining that the fan parameter update data stored in the first temporary storage region of the temporary storage device is valid, the fan parameter data stored in the second temporary storage region using the fan parameter update data stored in the first temporary storage region.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
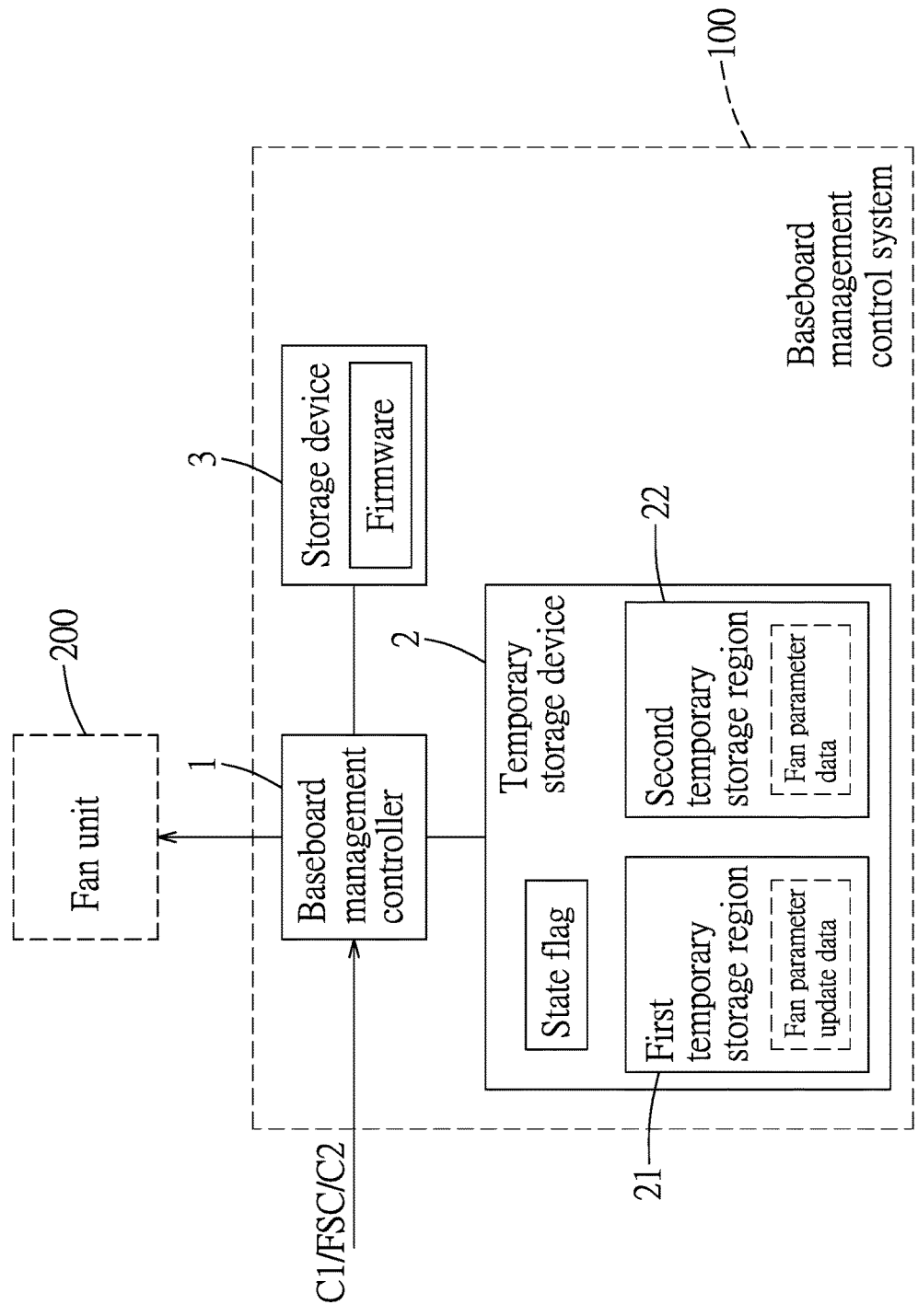
FIG. 1 is a block diagram illustrating a baseboard management control system used to implement an embodiment of the method of updating baseboard management controller firmware according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, the embodiment of the method of updating baseboard management controller firmware for fan speed control according to this disclosure is implemented by a baseboard management control system 100. In this embodiment, the baseboard management control system 100 is applied to a server (a computer device, not shown) that includes a fan unit 200 for heat dissipation of the server. In this embodiment, the fan unit 200 includes multiple fans; each fan might be controlled to rotate at different speeds. The baseboard management control system 100 controls operation of the fan unit 200 to ensure normal operation of the server when the server is in use. The baseboard management control system 100 includes a temporary storage device 2, a storage device 3, and a baseboard management controller 1 coupled to the temporary storage device 2, the storage device 3 and the fan unit 200. The baseboard management controller 1 may operate in an update mode or a normal operation mode, and may be integrated with the temporary storage module 2 on a management mother board to serve as a management control platform.

The temporary storage device 2 may for example be, but not limited to, a random access memory (RAM) module, and has a first temporary storage region 21 and a second temporary storage region 22. The temporary storage device 2 stores therein a state flag that indicates whether or not the baseboard management controller 1 is in a data receiving state.

The storage device 3 may for example be, but not limited to, a flash memory module, and stores therein a firmware associated with server motherboard monitoring and operation of the fan unit 200. In this embodiment, the firmware contains software codes for fan speed control (FSC) and also fan parameter data (FSC parameter data) that is associated with control of a rotary speed of the fan unit 200.

When the server is in use (i.e., being online), the temporary storage device 2 receives the firmware from the storage device 3 and stores the same therein (not shown in FIG. 1) for execution. In this embodiment, the fan parameter data is stored in the second temporary storage region 22, but this disclosure is not limited thereto. In other embodiments, the fan parameter data may be stored in the first temporary storage region 21. In the normal operation mode, the baseboard management controller 1 controls the rotary speed of the fan unit 200 by executing the firmware stored in the temporary storage device 2.

Figure 2:
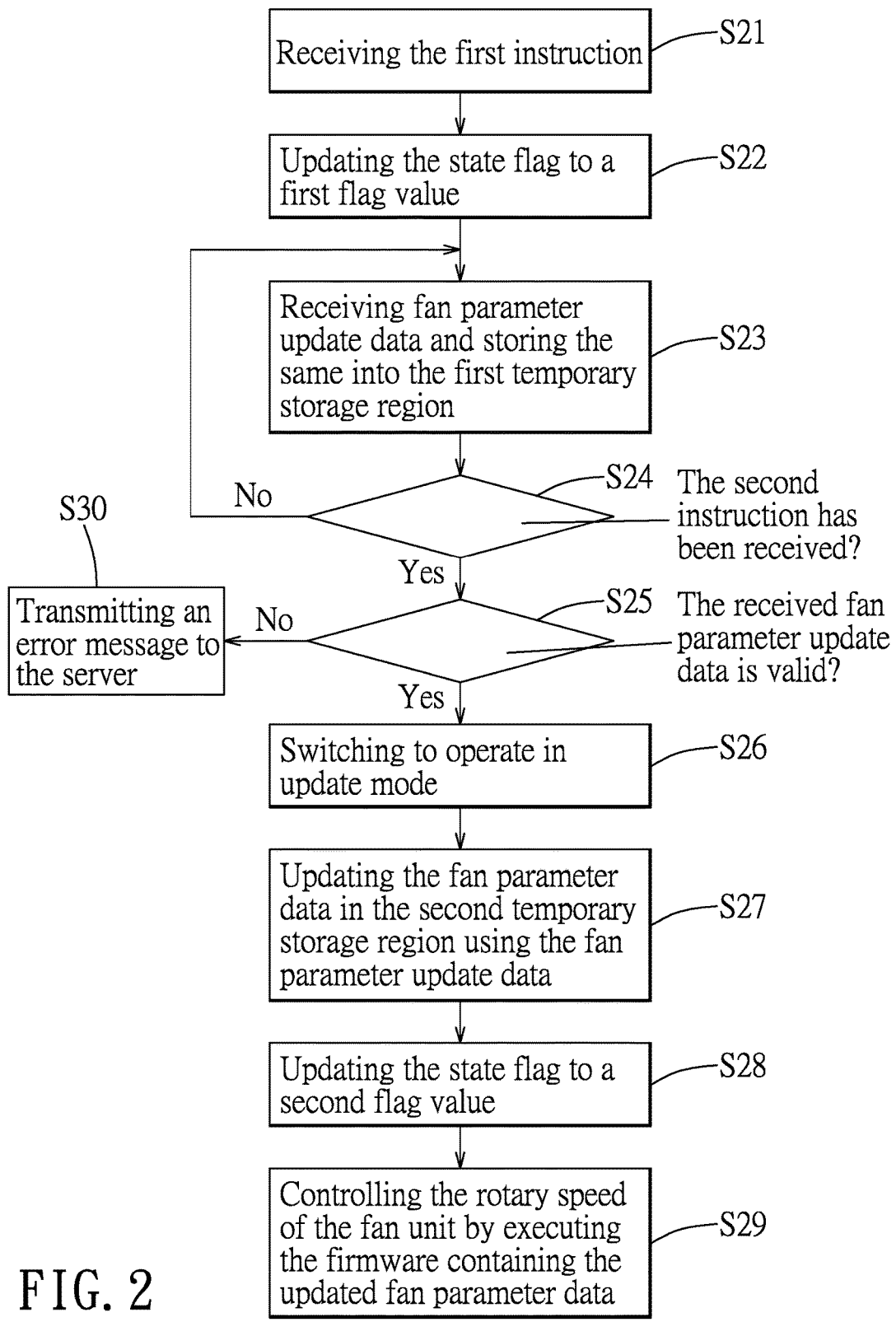
FIG. 2 is a flow chart illustrating steps of the embodiment.

Further referring to FIG. 2, the embodiment of the method of updating baseboard management controller firmware for fan speed control includes steps S21-S30 as described hereinafter.

In step S21, when a user intends to update the fan parameter data of the firmware, the user may operate the server to transmit a first instruction (C1, e.g., an IPMI OEM command indicating a firmware update operation) to the baseboard management controller 1 through an operating system (not shown) of the server. It is noted that, the user may either directly or remotely operate the server to issue the first instruction (C1).

In step S22, the baseboard management controller 1 enters the data receiving state in response to receipt of the first instruction (C1), and updates the state flag to a first flag value (e.g., TRUE, but not limited thereto) indicating that the baseboard management controller 1 is in the data receiving state.

In step S23, the baseboard management controller 1 starts to receive user desired fan parameter update data associated with control of the rotary speed of the fan unit 200 from a computer device, which may, but not necessarily, be the server being operating by the user. In this embodiment, the baseboard management controller 1 stores the fan parameter update data thus received in the first temporary storage region 21 of the temporary storage device 2. In other embodiments where the fan parameter data has been stored in the first temporary storage region 21, the fan parameter update data may be stored in the second temporary storage region 22. In one embodiment, a direct user may manually operate the server to transmit the fan parameter update data to the baseboard management controller 1 through the operating system of the server, while in another embodiment, a remote user may transmit the fan parameter update data to the server via network communication, and then remotely operate the server to transmit the same to the baseboard management controller 1 through the operating system of the server.

In this embodiment, the fan parameter data includes a series of parameter codes, and the fan parameter update data includes a series of parameter update codes (e.g., a series of IPMI OEM commands for writing the fan parameter data) which completely correspond to the parameter codes of the fan parameter data one by one, and a predetermined hash value associated with the parameter update codes for verifying whether or not the parameter update codes are valid. In order to ensure that the fan parameter update data is transmitted to the baseboard management controller 1 in full, after the transmission of the fan parameter update data to the baseboard management controller 1 is finished, the user may send to the baseboard management controller 1 a second instruction indicating that the transmission of the fan parameter update data to the baseboard management controller 1 has been finished through the operating system of the server.

In step S24, the baseboard management controller 1 determines that the fan parameter update data has been received in full thereby upon receipt of the second instruction, and the flow goes to step S25. If the baseboard management controller 1 does not receive the second instruction, which means that the transmission of the fan parameter update data has not yet finished, the flow goes back to step S23 to receive the remaining portion of the fan parameter update data.

In step S25, the baseboard management controller 1 determines whether or not the fan parameter update data stored in the first temporary storage region 21 of the temporary storage device 2 is valid. In one embodiment, the baseboard management controller 1 may receive a checksum of the fan parameter update data from the server, calculate a checksum of the fan parameter update data stored in the first temporary storage region 21, and compare the received checksum and the calculated checksum to determine whether the fan parameter update data stored in the first temporary storage region 21 is valid. The flow goes to step S26 when the determination is affirmative, and goes to step S30, where the baseboard management controller 1 transmits an error message indicating that the fan parameter update data is invalid, when otherwise. In this embodiment, the baseboard management controller 1 may use a hash function, which is the same as that being used to generate the predetermined hash value, to acquire a hash value associated with the received fan parameter update data that is currently stored in the first temporary storage region 21 in this embodiment, and determine whether or not the received fan parameter update data is valid by determining whether or not the acquired hash value matches the predetermined hash value. In other words, when the acquired hash value matches the predetermined hash value, the baseboard management controller 1 determines that the received fan parameter update data is valid.

It is noted that, in steps S21 to S25, the baseboard management controller 1 operates in the normal operation mode, and controls the rotary speed of the fan unit 200 by executing the firmware stored in the temporary storage device 2 with the fan parameter data stored in the second temporary storage region 22.

In step S26, the baseboard management controller 1 switches to operating in the update mode where the baseboard management controller 1 controls the fan unit 200 to operate at a predetermined rotary speed (e.g., a maximum rotary speed).

In step S27, the baseboard management controller 1 updates the fan parameter data stored in the second temporary storage region 22 using the fan parameter update data stored in the first temporary storage region 21 by way of, for example, overwriting the fan parameter data with the fan parameter update data, but this disclosure is not limited thereto. After completion of updating the fan parameter data stored in the second temporary storage region 22, the baseboard management controller 1 further updates the firmware stored in the storage device 3 using the firmware which is stored in the temporary storage device 2 and which has the updated fan parameter data (i.e., the fan parameter update data). In this embodiment, the fan parameter data which has been updated using the fan parameter update data is stored in the second temporary storage region 22 in a form of a parameter table, but this disclosure is not limited thereto.

In step S28, the baseboard management controller 1 updates the state flag stored in the temporary storage device 2 to a second flag value (e.g., FALSE) which is different from the first flag value and which indicates that the baseboard management controller 1 is not in the data receiving state.

In step S29, the baseboard management controller 1 switches back to operating in the normal operation mode, and controls the rotary speed of the fan unit 200 by executing the firmware which is stored in the temporary storage device 2 and which has the fan parameter data thus updated and stored in the second temporary storage region 22.

In summary, in the method of updating baseboard management controller firmware for fan speed control according to this disclosure, when core software codes of the firmware need no change and only a modification of the fan parameter data of the firmware is required, the baseboard management controller 1 may be triggered using the first instruction (C1) to enter the data receiving state and the update mode, enabling the user to update the fan parameter data of the firmware at any time as desired without re-burning the whole firmware, even if the server is in use (i.e., being online). After completion of the update of (the fan parameter data of) the firmware, the baseboard management controller 1 may directly control the rotary speed of the fan unit 200 using the firmware having the updated fan parameter data without re-initialization. Accordingly, when the user intends to update the fan parameter data of the baseboard management controller 1, the conventional burning process which may require rebooting the server may be omitted. In addition, during the updating process of the firmware, the baseboard management controller 1 controls the fan unit 200 to temporarily operate at the predetermined rotary speed, and thus operation of the server would not be affected by the update operation, ensuring unaffected use of the server while attempting to optimize the firmware, and minimizing time and manpower required for the update of the fan parameter data of the firmware.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of updating baseboard management controller firmware for fan speed control comprising:
    providing a baseboard management control system that includes:
    a storage device for storing therein a firmware associated with operation of a fan unit of a computer device, the firmware containing fan parameter data that is associated with control of a rotary speed of the fan unit;
    a temporary storage device that is used to store the firmware received from the storage device, and that has a first temporary storage region, and a second temporary storage region for storing therein the fan parameter data; and
    a baseboard management controller coupled to the fan unit, the storage device and the temporary storage device, the baseboard management controller controlling the rotary speed of the fan unit by executing the firmware stored in the temporary storage device;
    starting to receive, by the baseboard management controller in response to receipt of an instruction indicating a firmware update operation, fan parameter update data associated with control of the rotary speed of the fan unit, and storing the fan parameter update data thus received in the first temporary storage region of the temporary storage device;
    determining, by the baseboard management controller after completion of receipt and storage of the fan parameter update data in the first temporary storage region of the temporary storage device, whether or not the fan parameter update data stored in the first temporary storage region of the temporary storage device is valid; and
    updating, by the baseboard management controller after determining that the fan parameter update data stored in the first temporary storage region of the temporary storage device is valid, the fan parameter data stored in the second temporary storage region using the fan parameter update data stored in the first temporary storage region.

2. The method of updating baseboard management controller firmware of claim 1, wherein the temporary storage device further stores a state flag that indicates whether or not the baseboard management controller is in a data receiving state, said method of updating baseboard management controller firmware further comprising:
    before the starting to receive the fan parameter update data, updating, by the baseboard management controller upon receipt of the instruction, the state flag to a first flag value indicating that the baseboard management controller is in the data receiving state.

3. The method of updating baseboard management controller firmware of claim 2, wherein the updating the fan parameter data stored in the second temporary storage region further includes: switching, by the baseboard management controller, from a normal operation mode to an update mode.

4. The method of updating baseboard management controller firmware of claim 3, further comprising:
    updating, by the baseboard management controller after completion of the updating the fan parameter data stored in the second temporary storage region, the state flag to a second flag value which is different from the first flag value and which indicates that the baseboard management controller is not in the data receiving state.

5. The method of updating baseboard management controller firmware of claim 4, wherein the updating the state flag to the second flag value further includes:

switching, by the baseboard management controller, from the update mode to the normal operation mode, and controlling the rotary speed of the fan unit by executing the firmware which is stored in the temporary storage device and which has the fan parameter data thus updated and stored in the second temporary storage region.

6. The method of updating baseboard management controller firmware of claim 2, further comprising:

controlling, by the baseboard management controller before the updating the fan parameter data stored in the second temporary storage region, the fan unit to operate at a predetermined rotary speed.

7. The method of updating baseboard management controller firmware of claim 6, wherein the predetermined rotary speed is a maximum rotary speed of the fan unit.

8. The method of updating baseboard management controller firmware of claim 1, wherein the fan parameter update data includes a series of parameter update codes, and the fan parameter data which has been updated using the fan parameter update data is stored in the second temporary storage region in a form of a parameter table.

9. The method of updating baseboard management controller firmware of claim 1, further comprising:

updating, by the baseboard management controller after completion of the updating the fan parameter data stored in the second temporary storage region, the firmware stored in the storage device using the firmware that is stored in the temporary storage device and that has the fan parameter data thus updated.

10. The method of updating baseboard management controller firmware of claim 1, further comprising:

transmitting, by the baseboard management controller after determining that the fan parameter update data stored in the first temporary storage region of the temporary storage device is invalid, an error message indicating that the fan parameter update data is invalid to the computer device.

11. The method of updating baseboard management controller firmware of claim 1, wherein the determining whether or not the fan parameter update data stored in the first temporary storage region of the temporary storage device is valid includes:

receiving a first checksum of the fan parameter update data from the computer device;

calculating a second checksum of the fan parameter update data stored in the first temporary storage region; and comparing the first checksum and the second checksum to determine whether or not the fan parameter update data stored in the first temporary storage region of the temporary storage device is valid.

12. The method of updating baseboard management controller firmware of claim 1, further comprising:

receiving, by the baseboard management controller, a transmission completion instruction indicating that transmission of the fan parameter update data to the baseboard management controller has been finished;

wherein the determining whether or not the fan parameter update data stored in the first temporary storage region of the temporary storage device is valid is performed upon receipt of the transmission completion instruction.

* * * * *